United States Patent
Howe

(10) Patent No.: US 9,990,629 B2
(45) Date of Patent: Jun. 5, 2018

(54) INTERNET SERVICE PROVIDER (ISP) AUTHENTICATION OF ECOMMERCE TRANSACTIONS

(71) Applicant: MASTERCARD INTERNATIONAL INCORPORATED, Purchase, NY (US)

(72) Inventor: Justin X. Howe, Oakdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 119 days.

(21) Appl. No.: 14/085,177

(22) Filed: Nov. 20, 2013

(65) Prior Publication Data

US 2015/0142651 A1  May 21, 2015

(51) Int. Cl.
*G06Q 20/12* (2012.01)
*G06Q 20/40* (2012.01)

(52) U.S. Cl.
CPC ......... *G06Q 20/4016* (2013.01); *G06Q 20/12* (2013.01)

(58) Field of Classification Search
CPC ....... G06Q 20/38; G06Q 20/382; G06Q 20/40
USPC .......................................................... 705/41
See application file for complete search history.

(56) References Cited

U.S. PATENT DOCUMENTS

| | | | | |
|---|---|---|---|---|
| 8,577,804 B1 * | 11/2013 | Bacastow | ............ | G06Q 20/027 235/380 |
| 2008/0288405 A1 * | 11/2008 | John | ............ | G06Q 20/40 705/44 |
| 2010/0100406 A1 * | 4/2010 | Lim | ............ | G06Q 20/02 705/325 |
| 2013/0080351 A1 * | 3/2013 | Schneider | ............ | G06Q 40/04 705/36 R |

* cited by examiner

*Primary Examiner* — Jagdish Patel
*Assistant Examiner* — Liz P Nguyen
(74) *Attorney, Agent, or Firm* — Ohlandt, Greeley, Ruggiero & Perle, L.L.P.

(57) ABSTRACT

The present disclosure provides internet service provider (ISP) authentication of eCommerce transactions, more particularly, a method and system of associating an ISP recognition identification (ID) with a cashless payment account. A system, method, and software product are provided for fraud prevention in the field of cashless payment account transactions. A computing device receives details of completed eCommerce payment transactions. A number of ISP recognition IDs are also received indicating merchant URLs of personal computing devices. A computing device then flags all received ISP recognition IDs for a time period surrounding the completed eCommerce payment transactions, and defines sets of flagged ISP recognition IDs. The sets of flagged ISP recognition IDs are then compared in generating candidate ISP recognition IDs (i.e., ISP subscriber lines), which are associated with each cashless payment account. Further iterations allow for limiting of the number of ISP recognition IDs associated with each cashless payment account.

11 Claims, 5 Drawing Sheets

INTERNET SERVICE PROVIDER (ISP) AUTHENTICATION OF ECOMMERCE TRANSACTIONS

BACKGROUND OF THE DISCLOSURE

1. Field of the Disclosure

The present disclosure relates to internet service provider (ISP) authentication of eCommerce transactions. More particularly, the present disclosure relates to a method and system of associating for authentication purposes an ISP recognition identification (ID) with a cashless payment account used in an eCommerce transaction. The present disclosure provides advantages in fraud prevention, as well as in data collection for customers, merchants, and cashless payment account issuing institutions alike.

2. Description of the Related Art

Credit card companies (presently better referred to as "cashless payment account" institutions, thanks to a variety of new technologies for making payments including not only credit cards, debit cards, electronic wallets, transponder devices, near-field communication-enabled ("NFC") smartphones, or similar presently existing or after-arising technology) are confronted with the daily task of determining which of the millions of transactions being processed between consumers and merchants are real and which are fraudulent. It is estimated that the sum of all worldwide credit card fraud is $5.55 billion annually.

Numerous techniques are utilized by cashless payment account issuing institutions to detect fraudulent transactions. Cashless payment account institutions watch, for example, a small purchase followed immediately by a larger one, a purchase out of character with the usual buying habits of the individual, and substantial online purchases, as well as a variety of other techniques. Many of the existing techniques have flaws inherent in them, and cashless payment account issuing institutions constantly search for new and improved ways to avoid fraud. The existing techniques for registration-based fraud detection suffer from cashless payment account holders that are wary, negligent in registering, or intentionally avoid registration in fraud prevention programs, avoiding the benefits they provide.

Existing anti-fraud tools utilize IP address, browser and cookie settings and cardholder login to authenticate a customer. IP address driven approaches are suboptimal because IP addresses are reassigned dynamically over time, although they do help in determining the general geographic location of the internet user.

For example, PayPal prompts users with additional security measures if they access their account from a foreign IP address or VPN, indicating that IP address is a component of their authentication measures.

The use of browser settings are also suboptimal because these can only be captured by the merchant site being accessed, so this information is difficult (or is not) shared by merchants to collectively improve fraud detection. For example, if a purchase is made from an American credit card on an American IP address but the computer has Vietnamese characters installed and is set to a Vietnamese time zone, it will likely be rejected.

One scalable alternative to these methods is to have the cardholder opt in to the use of cell phone geolocation when authorizing a transaction. This method is less useful for eCommerce transactions than for face-to-face transactions, however, it is still useful given that payment cardholders will often make such purchases from their home (a recurring geolocation) or their workplace (another recurring geolocation).

There is a continuing need in addressing payment card theft and fraud, for authenticating the identity of a card user based on the point of sale as well as other usage, without the need for a user to enroll in a credit fraud reporting service. There is also a need, not addressed in any prior art, for relating databases of users' on-line activity(s) to match-up a user's activity recorded for one service with a different activity recorded for another service. Such information could be useful, for example, in eCommerce payment fraud prevention.

SUMMARY OF THE DISCLOSURE

The present disclosure provides a method, system, and computer product for authentication by association of a personal computing device's ISP recognition ID (such as by way of a non-limiting example, a subscriber phone number, a subscriber device ID, a subscriber IP address, or any unique identification generated by after-arising equivalent technology) with a cashless payment account (identifying an account number, name, address, and the like of the cashless payment account) of an eCommerce transaction, of millions pending simultaneously through a cashless payment account issuing institution and a cashless payment account network. Such information can be used, for example, to authenticate a user as a security measure for payment card users and issuers. The present disclosure provides advantages in fraud prevention, as well as in data collection for customers, merchants, and cashless payment account issuing institutions alike.

In accordance with an aspect of the present disclosure, during an execution of the presently disclosed method, system, and computer product, details of a first completed eCommerce payment transaction associated with a cashless payment account are received at a computing device associated with a matching database. A plurality of ISP recognition IDs are also received at the computing device associated with the matching database. In this embodiment, the ISP recognition IDs received a time interval or time intervals relative to before and/or after completion of the first eCommerce payment transaction are flagged to define a first set of flagged ISP recognition IDs. Details of a second completed eCommerce payment transaction associated with the same cashless payment account are also received at the computing device. More ISP recognition IDs are received, which are again flagged based upon receipt within a time interval or time intervals before and/or after completion of the second completed eCommerce payment transactions in defining a second set of flagged ISP recognition IDs. In this embodiment, there should be a time period lag between the transactions that validate each other. The first set of flagged ISP recognition IDs and the second set of flagged ISP recognition IDs are then compared against each other to look for ISP recognition IDs common to all sets of flagged ISP recognition IDs as candidate ISP recognition IDs. The cashless payment account is then associated with the candidate ISP recognition IDs.

Such resulting candidate ISP recognition IDs are arranged either one cashless payment account to one ISP recognition ID or one cashless payment account to more than one ISP recognition ID. Later executions of the presently disclosed method, system, and computer product allow for further limiting of the association between the cashless payment account and more than one ISP recognition ID, via further iterations of all or part of the present disclosure. As executions proceed further, ISP recognition IDs are removed from the candidate set of ISP recognition IDs and, in some embodiments, eventually only a single cashless payment account is associated with a single ISP recognition ID. This is a simple, yet effective, way after several iterations to associate a single cashless payment account with a single ISP subscriber line.

In accordance with another aspect of the present disclosure, the presently disclosed method, system, and computer product serves to receive a completed eCommerce payment included in the details received of a first completed eCommerce payment transaction. Before, during, or after the computing device receives details of the completed eCommerce payment transaction, the computing device receives a plurality of ISP recognition IDs. The ISP recognition IDs received within a time interval or intervals before and/or after completion of the first eCommerce payment transaction are flagged when defining a first set of flagged ISP recognition IDs. In this embodiment of the disclosure, the computing device performs the further step of identifying, using a voting method, the number of times that a specific cashless payment account makes an eCommerce transaction at the same time that a specific ISP recognition ID is active. Over time, each cashless payment account would show a recurring pattern of a single ISP recognition ID, which could be assumed to be the actual cardholder. The ISP recognition ID with the most "votes" would be considered the legitimate one, but any recognition with a history of prior association could equally be considered legitimate. As previously, in this embodiment further iterations of this process can occur involving receipt of further completed eCommerce transactions associated with the cashless payment account, receipt of further ISP recognition IDs, flagging of common ISP recognition IDs as between iterations, and the like to remove ISP recognition IDs not identified by the details of the further completed eCommerce payment transactions. The end result is a reduced number of iterations necessary to associate an ISP subscriber line with a single cashless payment account.

The present disclosure further provides a system for associating an internet service provider (ISP) recognition identification (ID) with a cashless payment account used in an eCommerce transaction. The system comprises a computing device associated with a matching database that receives details of a first completed eCommerce payment transaction associated with a cashless payment account, and also receives a plurality of ISP recognition IDs associated with a plurality of personal computing devices. The computing device flags all ISP recognition IDs received within a/time interval/s relative to before and/or after completion of said first completed eCommerce payment transaction to define a first set of flagged ISP recognition IDs. The computing device then receives details of a second completed eCommerce payment transaction associated with said cashless payment account, and flags all ISP recognition IDs received within a/time interval/s relative to before and/or after completion of said second completed eCommerce payment transaction to define a second set of flagged ISP recognition IDs. The computing device compares the first set of flagged ISP recognition IDs and the second set of flagged ISP recognition IDs in identifying ISP recognition IDs identified in both the first set of flagged ISP recognition IDs and the second set of flagged ISP recognition IDs as one or more candidate ISP recognition IDs. The computing device associates the cashless payment account with the candidate ISP recognition IDs The present disclosure still further provides a method that involves receiving from an internet service provider (ISP), from one or more databases, a first set of information including subscriber lines and eCommerce sites accessed by subscribers of the ISP; and retrieving by a financial transaction processing entity, from one or more databases, a second set of information including purchasing and payment activities on a payment card associated with eCommerce sites. The method further involves identifying, for the purchasing and payment activities on a payment card associated with the eCommerce sites, the subscriber lines that accessed the same eCommerce sites, over a predetermined period of time.

The present disclosure still further provides a method of associating an internet service provider (ISP) recognition identification (ID) with a cashless payment account. The method comprises receiving a plurality of completed eCommerce payment transactions conducted on a cashless payment account and accessed eCommerce sites; and receiving a plurality of ISP recognition IDs and accessed eCommerce sites, with the eCommerce sites accessed with a computing device. The method further comprises identifying, for the eCommerce payment transactions conducted on a cashless payment account and accessed eCommerce sites, the ISP recognition IDs that accessed the same eCommerce sites, over a predetermined period of time; and associating the ISP recognition ID with the cashless payment account.

In accordance with this disclosure, a system is provided that comprises one or more databases configured to store a first set of information including subscriber lines and eCommerce sites accessed by subscribers of an internet service provider (ISP), one or more databases configured to store a second set of information including purchasing and payment activities on a payment card associated with the eCommerce sites, and a processor. The processor is configured to identify, for the purchasing and payment activities on a payment card associated with the eCommerce sites, the subscriber lines that accessed the same eCommerce sites over a predetermined period of time.

This disclosure also provides a system that comprises one or more databases configured to store a first set of information including a plurality of completed eCommerce payment transactions conducted on a cashless payment account and accessed eCommerce sites, one or more databases configured to store a second set of information including a plurality of ISP recognition IDs and accessed eCommerce sites (where the eCommerce sites are accessed with a computing device), and a processor. The processor is configured to identify, for the eCommerce payment transactions conducted on a cashless payment account and accessed eCommerce sites, the ISP recognition IDs that accessed the same eCommerce sites over a predetermined period of time, and associate the ISP recognition ID with the cashless payment account.

Prior approaches focus on authentication by the cardholder, merchant or payment network rather than using the communications conduit (i.e., the ISP) to provide authentication. Authentication by the ISP offers certain advantages. For example, the length of time the ISP subscription has been open can be used as a predictor of fraud. Also, which financial institutions have been accessed on the particular computer can be used as predictive of legitimate ownership. If the eCommerce merchants where this cardholder bought items in the past match the eCommerce sites visited by this ISP subscriber, then the likelihood of fraud is reduced. Further, the methods of this disclosure do not require the participation of the merchant nor the issuer.

Various aspects of these embodiments can be interwoven to provide for more efficient association of a cashless payment account with a single or multiple ISP recognition IDs. In addition to the above aspects of the present disclosure, additional aspects, objects, features, and advantages will be apparent from the embodiments presented in the following description and in connection with the accompanying drawings.

BRIEF DESCRIPTION OF THE DRAWINGS

A component or a feature that is common to more than one figure is indicated with the same reference number in each figure.

DESCRIPTION OF THE EMBODIMENTS

Figure 1:
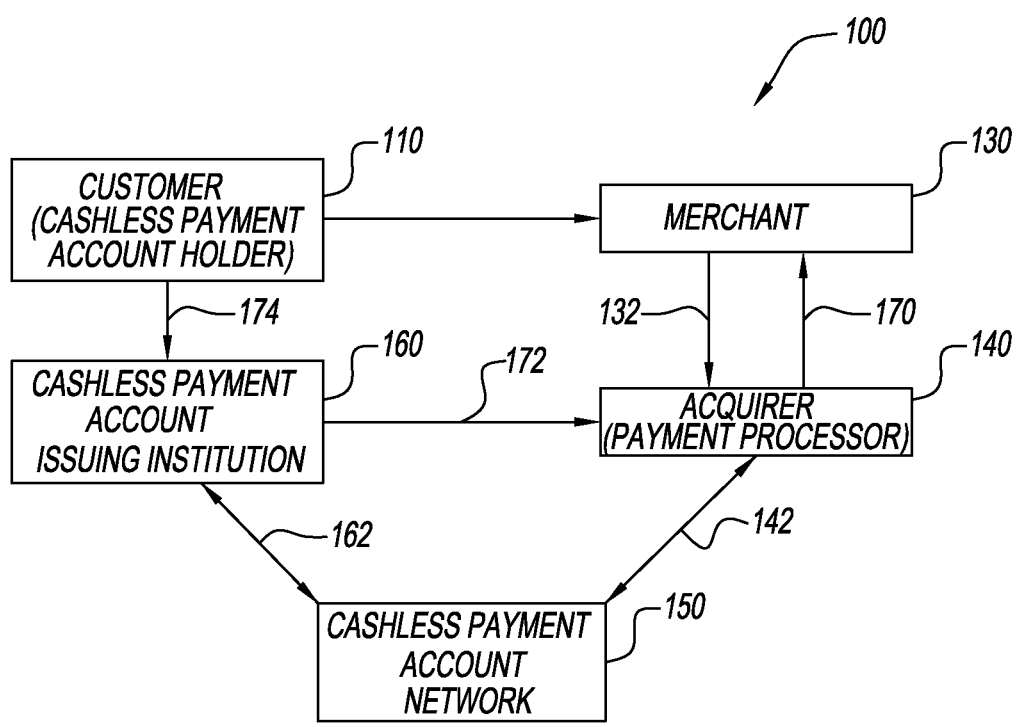
FIG. 1 is a block diagram illustrating a high-level view of system architecture of a financial transaction processing system in accordance with exemplary embodiments.

The following sections describe exemplary embodiments of the present disclosure. It should be apparent to those skilled in the art that the described embodiments of the present disclosure are illustrative only and not limiting, having been presented by way of example only. All features disclosed in this description may be replaced by alternative features serving the same or similar purpose, unless expressly stated otherwise. Therefore, numerous other embodiments of the modification thereof are contemplated as falling within the scope of the present disclosure as defined herein and equivalents thereto.

As used herein, the terms "entity", "entities", "user" and "users" can include one or more persons, organizations, businesses, institutions and/or other entities, including, but not limited to, financial institutions and services providers, that implement one or more portions of one or more of the embodiments described and/or contemplated herein. In particular, entities can include a person, business, school, club, fraternity or sorority, an organization having members in a particular trade or profession, sales representative for particular products, charity, not-for-profit organization, labor union, local government, government agency, or political party.

As used herein, the term "internet service provider" or "ISP" refers to an entity that offers users access to the internet and related services. ISPs comprise broadband service providers as well as internet access provided to mobile devices. Illustrative ISPs include, for example, telephone companies or other telecommunication providers.

As used herein, the term "cashless payment account" includes credit cards, debit cards, ATM cards, CHIP cards, electronic wallets, transponder devices, NFC-enabled smart phones, PIN transactions, or similar current or after-arising technology. Cashless payment account also includes virtual card numbers (VCNs) and payments made through an automated clearing house (ACH).

It is understood that, depending on applicable law, payment cardholders and/or telephone users can be notified of the processes by which various information is obtained, as described herein, by their issuer and/or mobile network operator. In certain cases, their specific consent can be needed to include their information in the relevant tables described herein.

In accordance with this disclosure, a unique identification number can be assigned by a providing entity in lieu of providing ISP recognition IDs (e.g., cell phone numbers) or cashless payment account numbers (e.g., payment card numbers) to a receiving entity in order to maintain privacy.

The computer program instructions in accordance with this disclosure can be provided to a processor of any "computing system," or "computing device," including a server, general purpose computer, special purpose computer, tablet pc, or any other programmable data processing apparatus to produce a machine, such that the instructions, which execute via the processor of the computer or other programmable data processing apparatus, create means for implementing the functions/acts specified in the flowchart and/or block diagram block or blocks. These computer programmable instructions can also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions can also be loaded onto a computer or other programmable data processing apparatus to cause a series of operational steps to be performed on the computer device or other programmable apparatus to produce a computer-implemented process so that the instructions which execute on the computer device or other programmable apparatus provides processes for implementing the functions/acts specified in the flowchart and/or block diagram block or blocks.

In particular, the steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It can be understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the disclosure.

In accordance with the present disclosure, information is matched on an anonymous basis by linking on purchase card transactions. For example, an identification number is associated with the first set of information that is conveyed from a telecommunication entity to a financial transaction processing entity to protect personally identifiable information (PII). This information is matched anonymously with financial transaction data by the financial transaction processing entity.

Referring to the figures and, in particular, FIG. 1, there is shown a block diagram generally represented by reference numeral 100 for displaying the general process of completing a payment transaction with a cashless payment account in an embodiment of the disclosure. A customer (also known as a cashless payment account holder) 110 desires to purchase a good or service from a merchant 130. Customer 110 is carrying a personal computing device as he or she shops (not shown here). Personal computing devices include cellular telephones, pagers, lap-tops, personal digital assistants, or other similar devices. Customer 110 presents a cashless payment account (such as a credit card, debit card, ATM card, CHIP card, electronic wallet, transponder device, NFC-enabled smart phone, PIN transaction, or similar current or after-arising technology) to merchant 130 for payment in connection with a payment transaction. Merchant 130 utilizes, at 132, his or her transaction acquiring device (also not shown) to communicate with a merchant acquiring institution or "Acquirer" 140 seeking approval for this transaction. Acquirer 140 transmits, at 142, an authorization message formatted pursuant to ISO 8583 (which is incorporated here in its entirety) or its present or after-arising equivalent. The authorization message contains "details" such as, at least, customer's 110 cashless payment account holder account identification, other account information, amount of the transaction, time of the transaction, and the like seeking approval of the transaction. The transmission is made, at 162, via a cashless payment account network 150 to a cashless payment account issuing institution 160 associated with the cashless payment account. Other "details" of a completed payment transaction are transmitted as well, including the preceding as well as (but not limited to) the date and time the transaction is occurring, and other related data. Should approval be appropriate, the cashless payment account issuing institution 160 transmits, at 162, an approval message via the cashless payment account network 150 and at 142 to Acquirer 140 who then retransmits, at 170, the approval message to merchant 130, who thusly learns the sale has been completed. As previously, the approval message is transmitted in formatting consistent with ISO 8583 or its present or after-arising equivalent.

The account of merchant 130 is credited, via 170, by Acquirer 140. The cashless payment account issuing institution 160 pays, via 172, Acquirer 140. Eventually, customer (cashless payment account holder) 110 pays, via 174, the cashless payment account issuing institution 160.

In connection with the present disclosure, customer 110 (or potential customer) broadcasts his or her IP address or ISP subscriber ID using his or her personal computing device before, during, or after an eCommerce payment transaction to the cashless payment account issuing institution 160 and/or the cashless payment account network 150 via a number of means as detailed below. Other customers, or potential customers also carrying personal computing device broadcast their own IP address or ISP subscriber ID at the same time. The broadcast of IP address or ISP subscriber ID can take place in active or passive fashion. In one embodiment, the broadcasting of IP address or ISP subscriber ID of personal computing devices is a passive process, not requiring an active choice to enroll in a program designed to track IP addresses or ISP subscriber IDs s. These ISP recognition IDs are obtained through observation of SMS messages, logging into a public hot-spot, or other currently existing or after-arising technology. As a means of non-limiting example, customer 110 transmits IP address or ISP subscriber ID passively (without opt-in) via IP address, phone cookie, or activation of a link on a cell phone application.

An ISP has a unique user account for every land line subscriber, and this information is stable, whereas IP addresses are reassigned dynamically over time. By relying on this subscriber-level view rather than IP addresses, much of the noise in internet authentication is avoided, particularly given that most people make eCommerce purchases from one of three internet connections: while they are at home (where they have a unique subscriber number); at the office (where they are customarily accessing from a fixed IP address or range of IP addresses); and from their mobile phone (often recognizable by their device ID or by a 3G/4G connection through their telecommunication company).

The ISP has access to all of the internet addresses (e.g., eCommerce sites) accessed by each subscriber (and which they sell in aggregated fashion, for example, as Experian's Hitwise product). These histories can be condensed to identify the internet user's bank relationships, subscription relationships (e.g., New York Times, Netflix, and the like), and eCommerce relationships (Amazon, iTunes, and the like). The ISPs can distinguish payments and subscriber access because it occurs over HTTPS (encrypted) rather than HTTP (unencrypted), so the ISP will see encryption when subscriber content or payments are being accessed.

In an embodiment, during operation of the present disclosure, a computing system associated with a matching database operated by the ISP receives a number of ISP recognition IDs (from one to billions) with each execution of the disclosure indicating merchant URLs associated with ISP recognition IDs (e.g., IP address, ISP subscriber ID, etc.) of personal computing devices associated with one customer 110 or many potential customers. The purpose of the present disclosure is to associate the passively (or actively) collected ISP recognition IDs with information on completed eCommerce payment transactions associated with cashless payment accounts (e.g., from cashless payment account issuing institution 160 or cashless payment account network 150) to allow association of these two data-types essentially linking ISP subscriber lines, merchant URLs, merchant names, and cashless payment accounts used to make eCommerce purchases, and provides various data collection benefits to cashless payment account holders, merchants, and the cashless payment account institutions alike.

In another embodiment, during operation of the present disclosure, a computing system associated with a matching database operated by the cashless payment account issuing institution 160 or cashless payment account network 150 receives (e.g., from an ISP) a number of ISP recognition IDs (from one to billions) with each execution of the disclosure indicating merchant URLs associated with ISP recognition IDs (e.g., IP address, ISP subscriber ID, etc.) of personal computing devices associated with one customer 110 or many potential customers. The purpose of the present disclosure is to associate the passively (or actively) collected ISP recognition IDs with information on completed eCommerce payment transactions associated with cashless payment accounts to allow association of these two data-types essentially linking ISP subscriber lines, merchant URLs, merchant names, and cashless payment accounts used to make eCommerce purchases, and provides various data collection benefits to cashless payment account holders, merchants, and the cashless payment account institutions alike.

Figure 2:
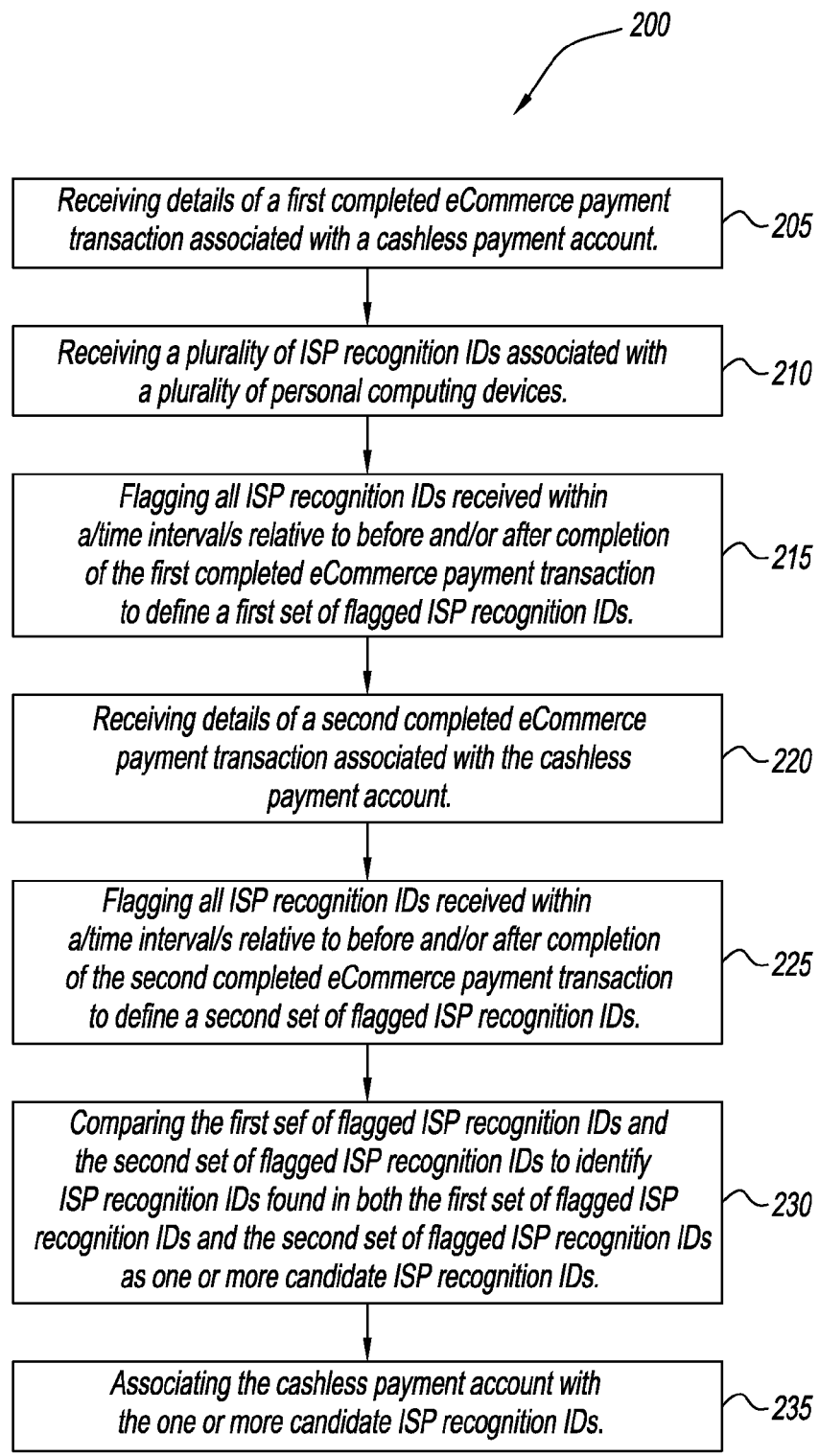
FIG. 2 illustrates a flow chart displaying basic steps of a method comprising an exemplary embodiment of this disclosure.

Referring to FIG. 2, a preferred embodiment of this disclosure involves a method 200 of associating an internet service provider (ISP) recognition identification (ID) with a cashless payment account. The method involves receiving details of a first completed eCommerce payment transaction associated with a cashless payment account at 205. A plurality of ISP recognition IDs associated with a plurality of personal computing devices are received at 210. All ISP recognition IDs received within a/time interval/s relative to before and/or after completion of the first completed eCommerce payment transaction are flagged at 215 to define a first set of flagged ISP recognition IDs. At 220, details of a second completed eCommerce payment transaction associated with the cashless payment account are received. All ISP recognition IDs received within a/time interval/s relative to before and/or after completion of the second completed eCommerce payment transaction are flagged at 225 to define a second set of flagged ISP recognition IDs. At 230, the first set of flagged ISP recognition IDs are compared with the second set of flagged ISP recognition IDs in identifying ISP recognition IDs found in both the first set of flagged ISP recognition IDs and the second set of flagged ISP recognition IDs to gives one or more candidate ISP recognition IDs. At 235, the cashless payment account is associated with the one or more candidate ISP recognition IDs.

The above method can identify, for a single eCommerce payment transaction conducted on a cashless payment account and accessed eCommerce site, a single ISP subscriber line which accessed the same eCommerce site. The above method can also identify, using a voting method described herein, the number of times that a specific cashless payment account makes an eCommerce transaction at the same time that a specific ISP recognition ID is active. In an embodiment, at least some of the received plurality of ISP recognition IDs are received at a computing device selectively one of before, during, and after a time of receiving the details of the first completed eCommerce payment transaction. In accordance with the above method, fraud risk can be determined based on associating the cashless payment account with the one or more candidate ISP recognition IDs.

Figure 3:
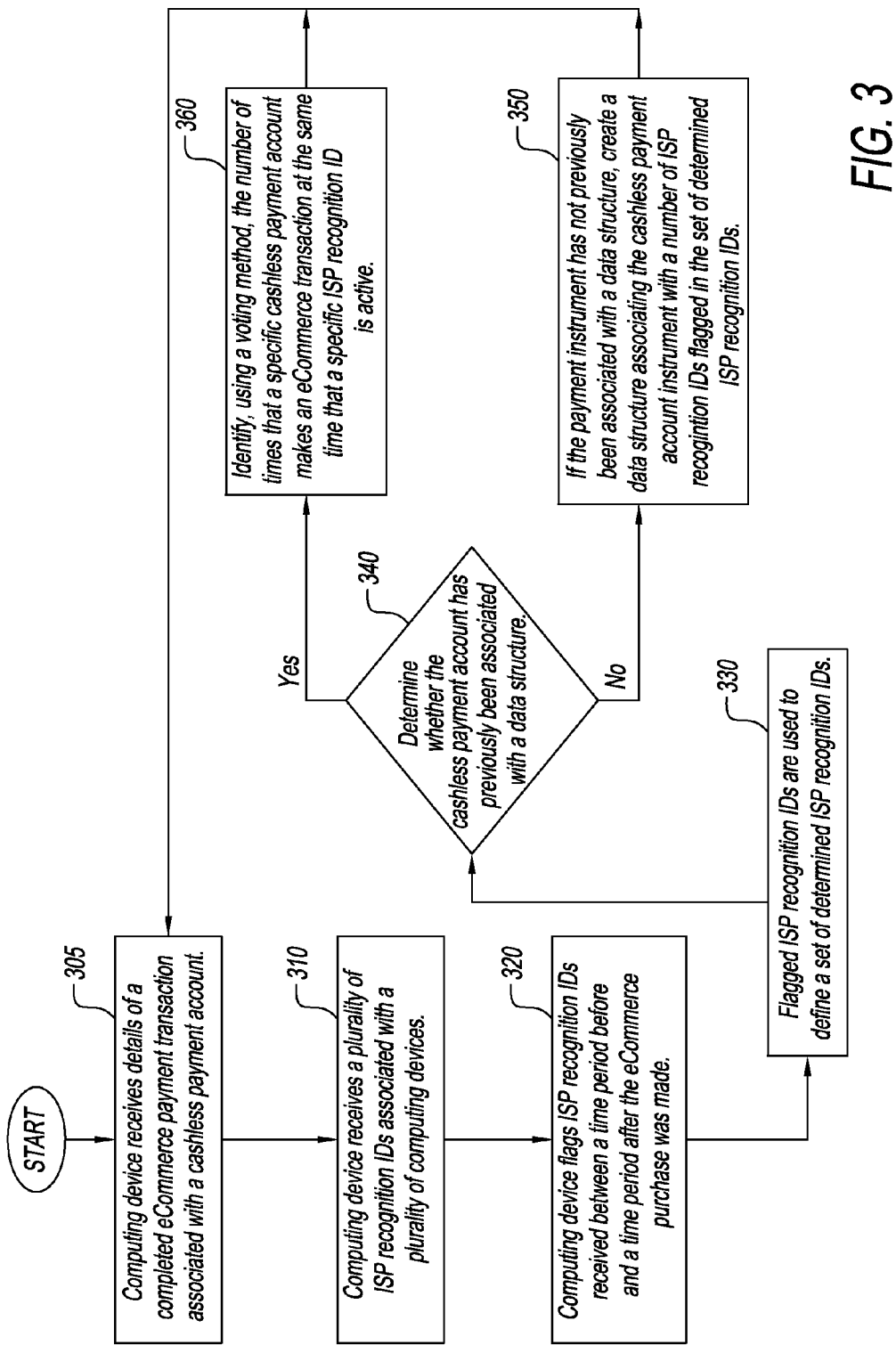
FIG. 3 illustrates a flow chart displaying basic steps of a method comprising an exemplary embodiment of this disclosure.

Referring to FIG. 3, basic steps of a method comprising an embodiment of the disclosure are shown. A computing device associated with a matching database receives details of a completed eCommerce payment transaction associated with a cashless payment account (step 305). Details of a completed eCommerce payment transaction include any of, but are not limited to, the type of card used to make a purchase at a merchant, the name of the merchant, the amount of the purchase, the type of the purchase, and the date/time the payment was completed. The computing device also receives a plurality of ISP recognition IDs from personal computing devices associated with customers, potential customers, and other individuals possessing personal computing devices configured to transmit ISP recognition IDs (step 310). These received ISP recognition IDs can number from one to millions or billions. The ISP recognition IDs each indicate the identity of a personal computing device.

The computing device associated with the matching database then flags all ISP recognition IDs if they are received between a time period or time periods (also known as "time interval[s]") after a completion of the eCommerce payment transaction (step 320) and utilize flagged ISP recognition IDs to define a set of determined flagged ISP recognition IDs (step 330). In some embodiments the time period before the eCommerce transaction was processed and the time period after the eCommerce transaction was processed are symmetric (i.e., they are equal), e.g., ten minutes before and after the transaction. In other embodiments of the disclosure, asymmetric time periods can be used where the before and after time periods are different, such as the time period before the eCommerce transaction was processed is ten minutes and the time period after the eCommerce transaction was processed is forty-five minutes. In some embodiments, the time periods range between five minutes and one hour. Lastly, in some embodiments only one time period before or after completion of the completed payment transaction is considered.

The flagged ISP recognition IDs flagged in these time periods are then placed into a computer storage unit, such as any type of linked list, node, structure, text file, object, variable, SQL-database, or other type of data storage unit capable of storing such data, as would be understood by one of skill in the art. In some embodiments, the computing device then determines whether the cashless payment account has been previously associated with a data structure (step 340). If the cashless payment account has not been previously associated with a data structure linking the cashless payment account with candidate ISP recognition IDs (i.e., ISP subscriber line), execution proceeds in step 350 to creating a data structure associating the cashless payment account with a number of ISP recognition IDs previously flagged in the set of determined flagged ISP recognition IDs.

The data structure takes the form of any data structure, including objects, variables, text files, SQL-databases, or any other data storage unit capable of storing such data. This newly created data structure will associate all flagged ISP recognition IDs with a cashless payment account (as further discussed below). While this might provide a one-to-one matching of an ISP recognition ID (i.e., ISP subscriber line) and a cashless payment account at an early stage, further iterations of the disclosure disclosed herein can provide more specific information. On the other hand, if a cashless payment account has previously been associated with a data structure, at step 360, a voting method can be used to identify the number of times that a specific cashless payment account makes an eCommerce transaction at the same time that a specific ISP recognition ID is active. Over time, each cashless payment account would show a recurring pattern of a single ISP recognition ID, which could be assumed to be the actual cardholder. The ISP recognition ID with the most "votes" would be considered the legitimate one, but any recognition with a history of prior association could equally be considered legitimate. In either event, after step 350 or 360, execution returns to step 310, allowing for further successive iterations further limiting the number of ISP recognition IDs associated with a cashless payment account. In other embodiments, instead of a data structure, a modification is performed to a set of flagged ISP recognition IDs as execution proceeds.

The voting method referred to above is particularly useful in instances where a payment cardholder may access eCommerce websites from their home, office, mobile device, etc. In such a case, the payment cardholder would have several ISP recognition IDs. Similarly, the payment cardholder may have several payment cards. By use of the voting method in accordance with the method of this disclosure, a home ISP recognition ID, for example, will not be discarded as soon as the payment cardholder makes an eCommerce transaction from his or her office ISP recognition ID.

Figure 4:
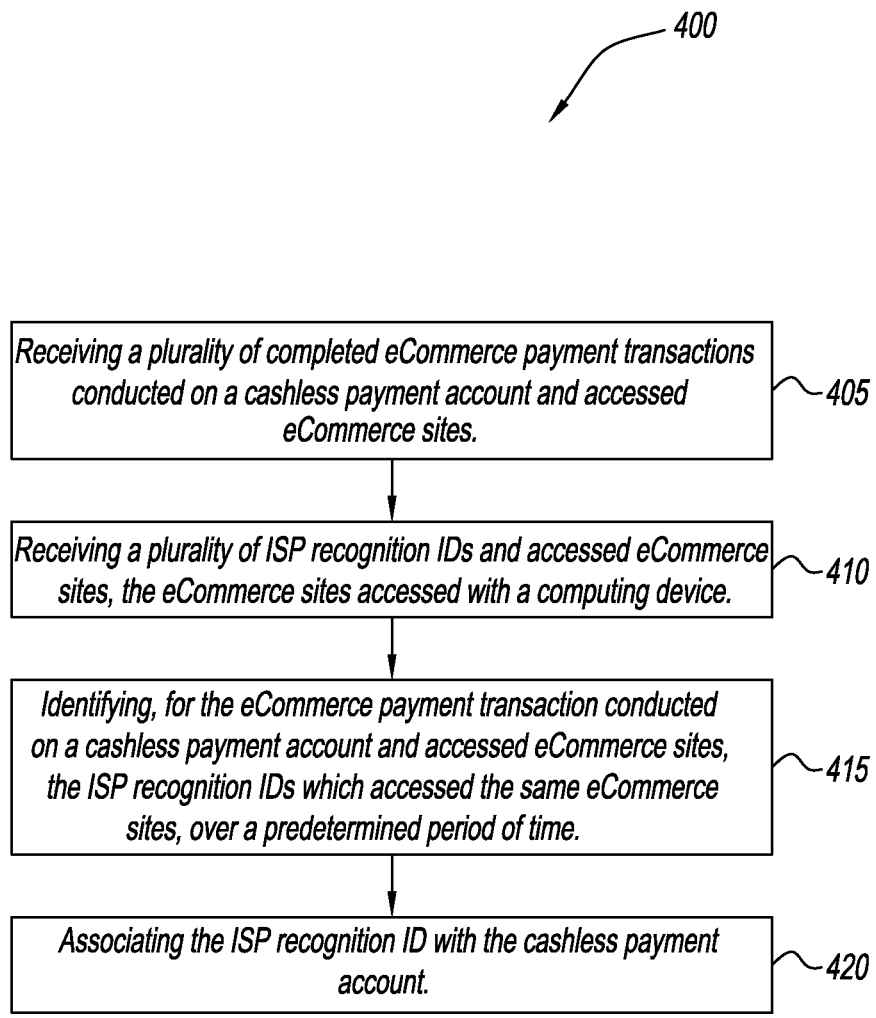
FIG. 4 illustrates a flow chart displaying basic steps of a method comprising an exemplary embodiment of this disclosure.

In another embodiment of the present disclosure, a method of associating an internet service provider (ISP) recognition identification (ID) with a cashless payment account is provided. Referring to FIG. 4, the method 400 comprises receiving a plurality of completed eCommerce payment transactions conducted on a cashless payment account and accessed eCommerce sites at 405, and receiving a plurality of ISP recognition IDs and accessed eCommerce sites at 410. The eCommerce sites are accessed with a computing device. The method further comprises identifying at 415, for the eCommerce payment transactions conducted on a cashless payment account and accessed eCommerce sites, the ISP recognition IDs that accessed the same eCommerce sites, over a predetermined period of time, and associating at 420 the ISP recognition ID with the cashless payment account.

The above method can identify, for a single eCommerce payment transaction conducted on a cashless payment account and accessed eCommerce site, a single ISP subscriber line which accessed the same eCommerce site. The above method can also identify, using a voting method described herein, the number of times that a specific cashless payment account makes an eCommerce transaction at the same time that a specific ISP recognition ID is active. In an embodiment, at least some of the received plurality of ISP recognition IDs are received at a computing device selectively one of before, during, and after a time of receiving the details of the first completed eCommerce payment transaction. In accordance with the above method, fraud risk can be determined based on associating the cashless payment account with the one or more candidate ISP recognition IDs.

In yet another embodiment of the present disclosure, a method is provided that comprises receiving, from one or more databases, a first set of information including internet service provider (ISP) subscriber lines and eCommerce sites accessed by the ISP subscriber lines, and receiving a second set of information including purchasing and payment activities on a payment card associated with eCommerce sites. The method further comprises identifying, for the purchasing and payment activities on a payment card associated with the eCommerce sites, the ISP subscriber lines that accessed the same eCommerce sites over a predetermined period of time.

In yet another embodiment of this disclosure, a payment cardholder pays his or her ISP bill with a cashless payment account. The ISP then knows that this card number and subscriber line are associated with each other. Any eCommerce purchases made on that subscriber line would accordingly be low fraud risk. Alternatively, if the ISP is not paid by a credit card, a subset of banks with relationships to this subscriber line based on encrypted access to Chase, Bank of America, or similar sites can be identified. These banks only have cards with known bank identification numbers (BINS) (the 6 digit prefix at the front of the card), which also helps to identify the associated payment account.

Figure 5:
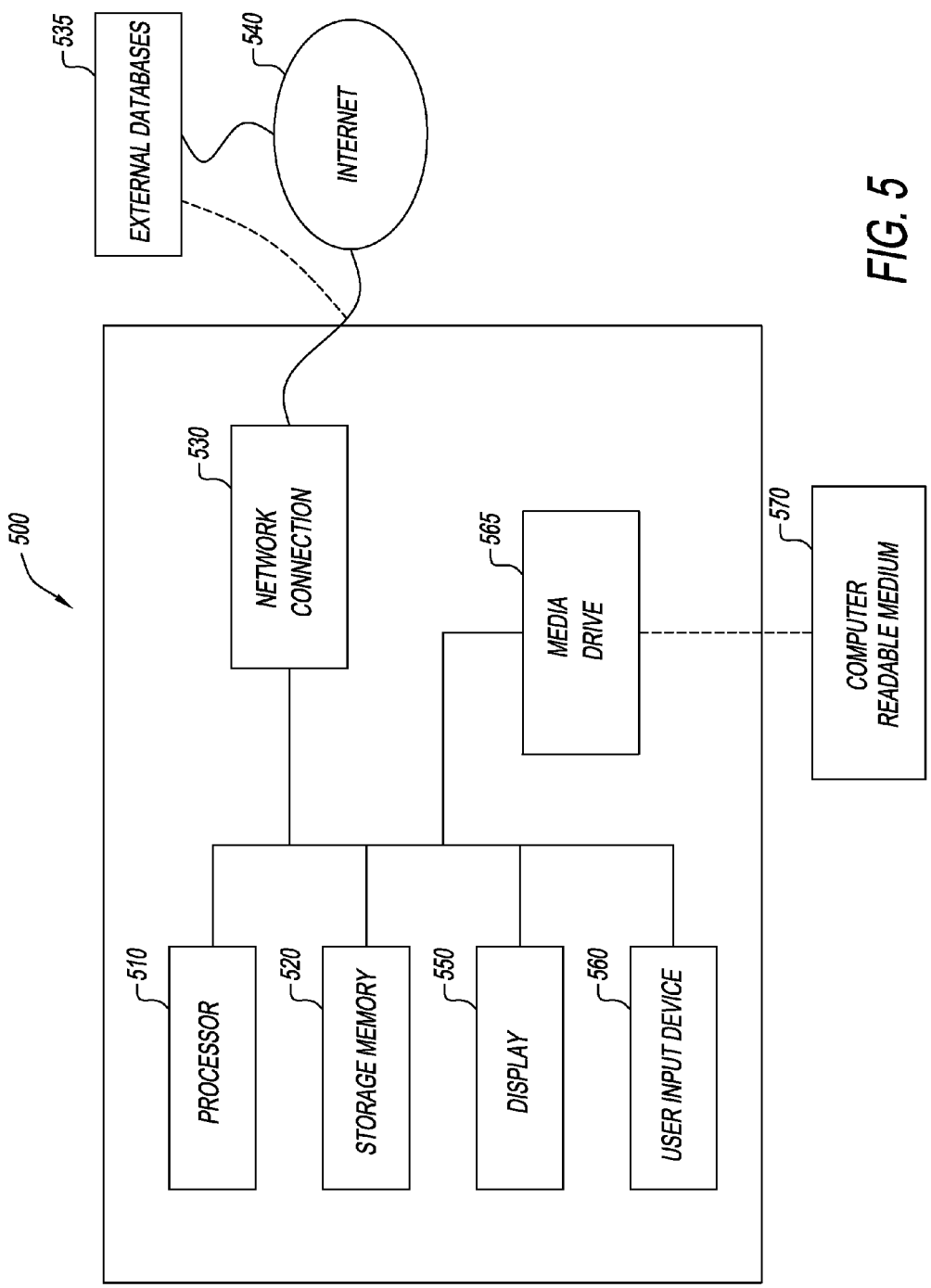
FIG. 5 is a schematic representation of a system for implementing various embodiments of the methods in accordance with exemplary embodiments of this disclosure.

As should be clear to those of skill in the art, the various embodiments of the methods of the present disclosure are implemented via computer software or executable instructions or code. Referring to FIG. 5, a system 500 for implementing the methods of the present disclosure includes at least a processor 510 including a Central Processing Unit (CPU), memory 520, and interface hardware 530 for connecting to external sources of data 535, for example, via the Internet 540.

Any of the raw, filtered, or generated tables and other databases described herein may be stored in an external memory 535, and accessed remotely, for example, via the Internet or other means, or can be stored in one of a number of local memory devices 520 of a system 500 for implementing the methods of the present disclosure.

The system 500 can be a computer with display 550 and input keypad or keyboard 560, and a media drive 565, or a handheld or other portable device with a display, keypad, memory, processor, network interface, and a media interface such as a flash drive. The memory 520 includes computer readable memory accessible by the CPU for storing instructions that when executed by the CPU 510 causes the processor 510 to implement the steps of the methods described herein. The memory 520 can include random access memory (RAM), read only memory (ROM), a storage device including a hard drive, or a portable, removable computer readable medium, such as a compact disk (CD) or a flash memory, or a combination thereof. The computer executable instructions for implementing the methods of the present disclosure can be stored in any one type of memory associated with the system 500, or distributed among various types of memory devices provided, and the necessary portions loaded into RAM, for example, upon execution.

In one embodiment, a non-transitory computer readable product is provided, which includes a computer readable medium, for example, computer readable medium 570 shown in FIG. 5 that can be accessed by the CPU via media drive 565, for storing computer executable instructions or program code for performing the method steps described herein. It should be recognized that the components illustrated in FIG. 5 are exemplary only, and that it is contemplated that the methods described herein can be implemented by various combinations of hardware, software, firmware, circuitry, and/or processors and associated memory, for example, as well as other components known to those of ordinary skill in the art.

One or more algorithms can be employed to determine formulaic descriptions of the assembly of the cashless payment account holder information including payment card billing, purchasing and payment transactions, and ISP recognition IDs including ISP subscriber lines and telephone numbers, using any of a variety of known mathematical techniques. These formulas, in turn, can be used to associate a cashless payment account with one or more ISP subscriber lines.

Illustrative algorithms for matching two anonymized data sets are described, for example, in copending U.S. patent application Ser. No. 13/920,920, filed Jun. 18, 2013, by Justin Xavier Howe, and U.S. patent application Ser. No. 13/671,791, filed Nov. 8, 2012, by Justin Xavier Howe, both of which are incorporated herein by reference in their entirety.

Where methods described above indicate certain events occurring in certain orders, the ordering of certain events may be modified. Moreover, while a process depicted as a flowchart, block diagram, or the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on."

While the disclosure has been particularly shown and described with reference to specific embodiments, it should be apparent to those skilled in the art that the foregoing is illustrative only and not limiting, having been presented by way of example only. Various changes in form and detail may be made therein without departing from the spirit and scope of the present disclosure. Therefore, numerous other embodiments are contemplated as falling within the scope of the present disclosure as defined by the accompanying claims and equivalents thereto.

What is claimed is:

1. A system comprising:
   one or more databases configured to store a first set of information including a plurality of completed eCommerce payment transactions conducted on a cashless payment account and accessed eCommerce sites;
   one or more databases configured to store a second set of information including a plurality of ISP recognition IDs and accessed eCommerce sites, said eCommerce sites accessed with a computing device;
   a processor configured to:
      identify, for the eCommerce payment transactions conducted on a cashless payment account and accessed eCommerce sites, the ISP recognition IDs which accessed the same eCommerce sites, over a predetermined period of time including a time interval relative to one of the eCommerce payment transactions;
      associate the ISP recognition ID with the cashless payment account; and
      identify, for a single eCommerce payment transaction conducted on a cashless payment account and accessed eCommerce site, a single ISP subscriber line which accessed the same eCommerce site.

2. The system of claim 1, wherein the processor is configured to associate said cashless payment account with said one or more candidate ISP recognition IDs in a data structure, and wherein said data structure is stored in a matching database.

3. The system of claim 1, wherein the processor is further configured to identify, using a voting method, the number of times that a specific cashless payment account makes an eCommerce transaction at the same time that a specific ISP recognition ID is active.

4. The system of claim 1, wherein the processor is configured to associate said cashless payment account with said one or more candidate ISP recognition IDs by selectively modifying said first set of flagged ISP recognition IDs, modifying said second set of flagged ISP recognition IDs, and creating a new set of candidate ISP recognition IDs.

5. The system of claim 1, wherein at least some of said received plurality of ISP recognition IDs are received at a computing device within the time interval, the time interval being selectively one of before, during, and after a time of receiving said details of a first completed eCommerce payment transaction.

6. The system of claim 1, wherein the processor is further configured to determine fraud risk based on associating said cashless payment account with said one or more candidate ISP recognition IDs.

7. The system of claim 5, wherein said time interval relative to before, after, or before and after, completion of said first completed eCommerce payment transaction is one selected from the group consisting of thirty seconds, one minute, two minutes, five minutes, ten minutes, twenty minutes, and forty minutes.

8. A system comprising:
one or more databases configured to store a first set of information including subscriber lines and eCommerce sites accessed by subscribers of an internet service provider (ISP);
one or more databases configured to store a second set of information including purchasing and payment activities on a payment card associated with the eCommerce sites; and
a processor configured to:
identify, for the purchasing and payment activities on a payment card associated with the eCommerce sites, the subscriber lines which accessed the same eCommerce sites, over a predetermined period of time including a time interval relative to one of the eCommerce payment transactions.

9. The system of claim 8, further comprising, said processor configured to identify, for a single eCommerce payment transaction conducted on a cashless payment account and accessed eCommerce site, a single ISP subscriber line which accessed the same eCommerce site.

10. A computer readable non-transitory storage medium storing instructions of a computer program, which when executed by a computer system, results in performance of steps for operating a system, the system comprising:
one or more databases configured to store a first set of information including a plurality of completed eCommerce payment transactions conducted on a cashless payment account and accessed eCommerce sites;
one or more databases configured to store a second set of information including a plurality of ISP recognition IDs and accessed eCommerce sites, said eCommerce sites accessed with a computing device;
a processor configured to:
identify, for the eCommerce payment transactions conducted on a cashless payment account and accessed eCommerce sites, the ISP recognition IDs which accessed the same eCommerce sites, over a predetermined period of time including a time interval relative to one of the eCommerce transactions; and
associate the ISP recognition ID with the cashless payment account.

11. A computer readable non-transitory storage medium storing instructions of a computer program, which when executed by a computer system, results in performance of steps for operating a system, the system comprising:
one or more databases configured to store a first set of information including subscriber lines and eCommerce sites accessed by subscribers of an internet service provider (ISP);
one or more databases configured to store a second set of information including purchasing and payment activities on a payment card associated with the eCommerce sites; and
a processor configured to:
identify, for the purchasing and payment activities on a payment card associated with the eCommerce sites, the subscriber lines which accessed the same eCommerce sites, over a predetermined period of time including a time interval relative to one of the eCommerce payment transactions.

* * * * *